(12) United States Patent
Nygren et al.

(10) Patent No.: US 12,466,174 B2
(45) Date of Patent: Nov. 11, 2025

(54) METHOD TO PRODUCE A LAMINATED SUBSTRATE AND SUCH A LAMINATED SUBSTRATE

(71) Applicant: Välinge Innovation AB, Viken (SE)

(72) Inventors: Per Nygren, Ramlösa (SE); Per Josefsson, Ramlösa (SE); Filip Sköld, Löddeköpinge (SE); Christoffer Nilsson, Helsingborg (SE)

(73) Assignee: VÄLINGE INNOVATION AB, Viken (SE)

( * ) Notice: Subject to any disclaimer, the term of this patent is extended or adjusted under 35 U.S.C. 154(b) by 270 days.

(21) Appl. No.: 18/192,858

(22) Filed: Mar. 30, 2023

(65) Prior Publication Data
US 2023/0311471 A1    Oct. 5, 2023

(30) Foreign Application Priority Data

Mar. 31, 2022   (SE) .................................. 2250400-5

(51) Int. Cl.
*B32B 37/18*    (2006.01)
*B32B 27/08*    (2006.01)
(Continued)

(52) U.S. Cl.
CPC ............ *B32B 37/182* (2013.01); *B32B 27/08* (2013.01); *B32B 27/20* (2013.01); *B32B 27/304* (2013.01); *B32B 37/10* (2013.01); *B32B 38/06* (2013.01); *B32B 2255/10* (2013.01); *B32B 2264/065* (2013.01); *B32B 2264/067* (2013.01); *B32B 2264/104* (2013.01); *B32B 2419/04* (2013.01); *B32B 2479/00* (2013.01); *B32B 2607/00* (2013.01)

(58) Field of Classification Search
CPC ....... B32B 37/182; B32B 37/10; B32B 27/08; B32B 27/20; B32B 38/06; B32B 2419/04
See application file for complete search history.

(56) References Cited

U.S. PATENT DOCUMENTS 3,741,851 A * 6/1973 Erb ..................... B29C 59/046
                                                428/161
5,304,272 A * 4/1994 Rohrbacker ............ B32B 27/08
                                                156/277
(Continued)

OTHER PUBLICATIONS

U.S. Appl. No. 18/510,800, filed Nov. 16, 2023, Martin Bjeremyr.
(Continued)

*Primary Examiner* — Daniel Mcnally
(74) *Attorney, Agent, or Firm* — Boone IP Law

(57) ABSTRACT

A method to produce a laminated substrate with an embossed structure, including: providing a polymer based film printed by at least one gravure cylinder, applying the polymer based film on a substrate including a polymer based material, pressing said polymer based film to the substrate, thereby forming a laminated substrate, and embossing the laminated substrate by an embossing device such that the laminated substrate obtains an embossed structure, wherein a circumference of said at least one gravure cylinder exceeds a perimeter of the embossing device, and wherein the circumference of said at least one gravure cylinder divided by the perimeter of the embossing device substantially corresponds to an integer.

15 Claims, 6 Drawing Sheets

(51) Int. Cl.
  *B32B 27/20* (2006.01)
  *B32B 27/30* (2006.01)
  *B32B 37/10* (2006.01)
  *B32B 38/06* (2006.01)

(56) References Cited

U.S. PATENT DOCUMENTS

| | | |
|---|---|---|
| 10,682,806 B2 | 6/2020 | Kackmann-Schneider et al. |
| 2003/0072919 A1* | 4/2003 | Watts, Jr. ................. B32B 3/00 428/203 |
| 2011/0250404 A1 | 10/2011 | Pervan et al. |
| 2014/0023832 A1 | 1/2014 | Pervan et al. |
| 2018/0326695 A1 | 11/2018 | Kroll et al. |

OTHER PUBLICATIONS

U.S. Appl. No. 18/325,534, filed May 30, 2023, Per Nygren.
U.S. Appl. No. 18/325,538, filed May 30, 2023, Christoffer Nilsson.
U.S. Appl. No. 14/994,593, filed Jan. 13, 2016, Niclas HÅkansson.
U.S. Appl. No. 18/487,049, filed Oct. 14, 2023, Christer Lundblad.
U.S. Appl. No. 18/409,984, filed Jan. 11, 2024, Darko Pervan.
International Search Report and Written Opinion received for PCT Patent Application No. PCT/SE2023/050287, mailed on Apr. 24, 2023, 10 pages.
Office Action received for Swedish Patent Application No. 2250400. 5, mailed on Oct. 4, 2022, 8 pages.

\* cited by examiner

METHOD TO PRODUCE A LAMINATED SUBSTRATE AND SUCH A LAMINATED SUBSTRATE

CROSS REFERENCE TO RELATED APPLICATIONS

The present application claims the benefit of Swedish Application No. 2250400-5, filed on Mar. 31, 2022. The entire contents of Swedish Application No. 2250400-5 are hereby incorporated herein by reference in their entirety.

TECHNICAL FIELD

Embodiments of the present disclosure relate to a method to produce a laminated substrate with an embossed structure, and such a laminated substrate. The laminated substrate may be intended to be divided into panels. The panels may be building panel, such as floor panel, furniture components, worktops, wall panels, ceiling panels.

TECHNICAL BACKGROUND

Panels such as building panels may be provided with a print for decorative purposes. The print may be a wood grain pattern simulating wood. In other examples, the print may be a stone pattern simulating stone, or a fantasy pattern. In order to increase the realistic look and feel of the panel, the panel may be provided with an embossed structure, comprising embossed portions and protrusions. The embossed structure may be in register with the print, such that the embossed structure matches the elements of the print. The elements of the print may be grains, knots, medullary rays, and other elements depicting structures in wood.

The print may be printed by various methods. One method commonly used is rotogravure printing, wherein the pattern is printed by several gravure cylinders. Digital printing allows more variations in the print, thus being more flexible compared to engraving gravure cylinders.

During recent years in the field of flooring, vinyl tiles have gained increasingly success. One such type of tiles is SPC (Stone Plastic Composite), wherein the core is formed in a continuous process by extruding the core material. The pattern is provided by a separate print film, which most commonly is printed by rotogravure printing. The print film and a protective layer arranged above the print film is pressed to the core by one or several pressing rollers. An embossed structure may be pressed into the panel by an embossing roller.

Due to the cost for engraving gravure cylinders and embossing rollers is the number of unique designs limited. Thus, after dividing the substrate into individual panels, a certain repetition of the pattern occurs after a number of panels. When installing the floor such repetitions are undesired. Increasing the number of variations and reduce the number of identical panels are therefore desired to improve the realistic look and feel of the panels.

SUMMARY

It is an object of at least embodiments of the present disclosure to provide an improvement over the above described techniques and known art.

According to a first aspect of the disclosure, a method to produce a laminated substrate with an embossed structure is provided. The method comprises:

providing a polymer based film printed by at least one gravure cylinder, applying the polymer based film on a substrate comprising a polymer based material, pressing said polymer based film to the substrate, thereby forming a laminated substrate, and embossing the laminated substrate by an embossing device such that the laminated substrate obtains an embossed structure, wherein a circumference of said at least one gravure cylinder exceeds a perimeter of the embossing device, and wherein the circumference of said at least one gravure cylinder divided by the perimeter of the embossing device substantially corresponds to an integer.

By substantially corresponds to an integer is understood to mean that the circumference of the gravure cylinder divided by the perimeter of the embossing device may differ from the integer with +/−0.01, such as being close to said integer.

Further, in an embodiment, the circumference of the gravure cylinder divided by the perimeter of the embossing device may differ from the integer no more than that the resulting embossed structure is less than 5 mm off the printed pattern. Preferably, the resulting embossed structure is less than 2 mm off the printed pattern.

The embossing device may be an embossing roller or an embossing belt.

If an embossing roller is used, the circumference of the gravure cylinder divided by the circumference of the embossing roller substantially corresponds to an integer exceeding 1.

The embossing device, such as an embossing roller, may have a rotation axis substantially parallel to a rotation axis of the gravure cylinder.

Pressing and embossing may take place simultaneously. Pressing and embossing may be performed by a common device, such as an embossing roller or embossing belt configured for both pressing and embossing.

Said at least one gravure cylinder may comprise at least a first pattern and a second pattern, the second pattern being subsequent to the first pattern in a rotational direction of said at least one gravure cylinder.

The embossed structure may correspond to at least one of the first pattern and the second pattern such that the embossed structure is register with at least one of the first pattern and the second pattern.

The embossed structure may correspond to the first pattern such that the embossed structure is register with at least the first pattern. The embossed structure may be partly in register with the second pattern.

The first pattern and the second pattern may not be identical. The first pattern and the second pattern may be unique.

The first pattern and the second pattern each may comprises a first set of design elements being identical and a second set of design elements not being identical. The embossed structure may be in register with the first set of design elements.

The embossed structure may be at least partly in register with the second pattern.

Said at least one gravure cylinder may comprise a number of subsequent patterns as seen in a rotational direction of said at least one gravure cylinder, wherein the number of subsequent patterns corresponds to said integer.

Each of said subsequent patterns may comprise a first set of design elements being identical and a second set of design elements not being identical, and wherein the embossed structure is at least in register with the first set of design elements.

The method may further comprise dividing the laminated substrate into panels, wherein a length of a panel substantially corresponds to a length of one of said patterns as seen in the rotational direction of said at least one gravure cylinder.

By substantially correspond is understood to mean that a distance between adjacent panels may be removed when dividing the substrate into panels, for example by sawing, and/or forming a mechanical locking system in the panels.

The method may further comprise dividing the laminated substrate into panels, wherein a length of a panel substantially corresponds to the perimeter of the embossing device.

The panel may be a plank or tile. The length of one of said patterns may correspond to the length of the plank or tile.

The pattern or patterns may be a wood grain pattern or wood grain patterns.

The substrate may be formed by a continuous process.

The polymer based film may be continuously applied on the substrate.

The polymer based film may be applied inline with the production process of the substrate.

Forming the substrate and applying the polymer based film may be a continuous process.

The substrate may be formed by extruding.

A barrel temperature of the extruder may be 145-225° C.

The polymer based film may be applied to the substrate prior to cooling the substrate.

The polymer of the polymer based film may be a thermoplastic polymer.

The polymer of the polymer based film may be a thermosetting polymer.

The polymer based film may be free from paper, such as being non paper based.

The polymer based film may be made of a polymeric material, such as a thermoplastic or a thermoset. The polymer based film may be a PVC film.

The polymer based material of the substrate may be a thermoplastic material or a thermosetting material.

The substrate may further comprise fillers. The fillers may be organic and/or inorganic. The fillers may be one or more of: calcium carbonate, chalk, limestone, talc, stone dust, fly ash, wood dust, grounded risk husk, cork, and bamboo dust.

Pressing may comprise applying heat and pressure.

The method may further comprise applying a protective layer to said polymer based film prior to embossing.

The protective layer may be a polymer based film such a thermoplastic film or a thermosetting film.

According to a second aspect of the disclosure, a method to produce a laminated substrate with an embossed structure is provided. The method comprises:
  providing a polymer based film printed with a print having a pattern repetition, wherein the pattern repetition comprises at least a first pattern and a second pattern being subsequent each other in a length direction of the polymer based film and wherein each pattern in the pattern repetition is not identical to another pattern in the pattern repetition, and wherein the pattern repetition has a pattern repetition length as measured in the length direction of the polymer based film,
  applying the polymer based film on a substrate comprising a polymer based material,
  pressing said polymer based film to the substrate, thereby forming a laminated substrate, and
  embossing the laminated substrate by an embossing device such that the laminated substrate obtains an embossed structure,
  wherein the pattern repetition length divided by a perimeter of the embossing device substantially corresponds to an integer exceeding 1.

By substantially corresponds to an integer is understood to mean that the pattern repetition length divided by the perimeter of the embossing device may differ from the integer with +/−0.01, such as being close to said integer.

Further, in an embodiment, the pattern repetition length divided by the perimeter of the embossing device may differ from the integer no more than that the resulting embossed structure is less than 5 mm off the printed pattern. Preferably, the resulting embossed structure is less than 2 mm off the printed pattern. The embossing device may have a rotation axis transverse the length direction of the polymer based film.

The pattern repetition length may be measured from the beginning of the first pattern in the pattern repetition to the end of the last pattern in the pattern repetition, as measured in the length direction of the polymer based film.

The embossing device may be an embossing roller or an embossing belt.

Pressing and embossing may take place simultaneously. Pressing and embossing may be performed by a common device, such as an embossing roller or embossing belt configured for both pressing and embossing.

If an embossing roller is used, the pattern repetition length divided by the circumference of the embossing roller substantially corresponds to an integer exceeding 1.

The embossed structure may be in register with at least one of the first pattern and second pattern.

The embossed structure may correspond to at least one of the first pattern and the second pattern such that the embossed structure is register with at least one of the first pattern and the second pattern.

The embossed structure may correspond to the first pattern such that the embossed structure is register with at least the first pattern. The embossed structure may be partly in register with the second pattern.

The first pattern and the second pattern may each comprise a first set of design elements being identical and a second set of design elements not being identical, and wherein the embossed structure is at least in register with the first set of design elements.

The first pattern and the second pattern may not be identical. The first pattern and the second pattern may be unique.

Each pattern in the pattern repetition may be unique.

The polymer based film may be printed by digital printing, for example inkjet printing.

The polymer based film may be printed by at least one gravure cylinder, wherein said at least first and second patterns are subsequent each other in a rotational direction of said at least one gravure cylinder, and wherein the circumference of said at least one gravure cylinder exceeds the perimeter of the embossing device.

The method may further comprise dividing the laminated substrate into panels, wherein a length of a panel substantially corresponds to a length of one of said at least first and second patterns in the length direction.

By substantially correspond is understood to mean that a distance between adjacent panels may be removed when dividing the substrate into panels, for example by sawing, and/or forming a mechanical locking system in the panels.

The method may comprise dividing the laminated substrate into panels, wherein a length of a panel substantially corresponds to the perimeter of the embossing device.

Each pattern in the pattern repetition may have an equal length.

The panel may be a plank or tile. The length of the pattern may correspond to the length of the plank or tile.

The pattern or patterns may be a wood grain pattern or wood grain patterns.

The substrate may be formed by a continuous process.

The polymer based film may be continuously applied on the substrate.

The polymer based film may be applied inline with the production process of the substrate.

Forming the substrate and applying the polymer based film may be a continuous process.

The substrate may be formed by extruding.

A barrel temperature of the extruder may be 145-225° C.

The polymer based film may be applied to the substrate prior to cooling the substrate.

The polymer of the polymer based film may be a thermoplastic polymer.

The polymer of the polymer based film may be a thermosetting polymer.

The polymer based film may be free from paper, such as being non paper based.

The polymer based film may be made of a polymeric material, such as a thermoplastic or a thermoset. The printed polymer based film may be a PVC film.

The polymer based material of the substrate may be a thermoplastic material or a thermosetting material.

The substrate may further comprise fillers. The fillers may be organic and/or inorganic. The fillers may be one or more of: calcium carbonate, chalk, limestone, talc, stone dust, fly ash, wood dust, grounded risk husk, cork, and bamboo dust.

Pressing may comprise applying heat and pressure.

The method may further comprise applying a protective layer to said polymer based film prior to embossing.

The protective layer may be a polymer based film such a thermoplastic film or a thermosetting film.

According to a third aspect of the disclosure, a laminated substrate is provided. The laminated substrate comprises:
- a substrate comprising a polymer based material,
- a polymer based film arranged on a surface of the substrate, wherein the polymer based film is printed with a print comprising at least a first pattern and a second pattern arranged subsequent each other in a length direction of the polymer based film,
- wherein the laminated substrate is provided with an embossed structure being identical for the first pattern and the second pattern, the embossed structure being in register with at least one of the first pattern and the second pattern, and wherein the first pattern and the second pattern are not identical.

The embossed structure may correspond to at least one of the first pattern and the second pattern such that the embossed structure is register with at least one of the first pattern and the second pattern.

The embossed structure may correspond to the first pattern such that the embossed structure is register with at least the first pattern. The embossed structure may be partly in register with the second pattern.

The first pattern and the second pattern may each comprise a first set of design elements being identical and a second set of design elements not being identical, wherein the embossed structure is at least in register with the first set of design elements.

The embossed structure may be partly in register with the second pattern.

The first pattern and the second pattern may not be identical. The first pattern and the second pattern may be unique.

The polymer based film may be printed by digital printing, for example ink jet printing.

The polymer based film may be printed by rotogravure printing.

The laminated substrate may be intended to be divided into at least two panels. A length of a panel may substantially correspond to a length of one of said at least two patterns in a length direction.

The panel may be a plank or tile. The length of the pattern may correspond to the length of the plank or tile.

The pattern or patterns may be a wood grain pattern or wood grain patterns.

The substrate may be extruded.

The polymer of the polymer based film may be a thermoplastic polymer.

The polymer of the polymer based film may be a thermosetting polymer.

The polymer based film may be free from paper, such as being non paper based.

The polymer based film may be made of a polymeric material, such as a thermoplastic or a thermoset. The printed polymer based film may be a PVC film.

The polymer based material of the substrate may be a thermoplastic material or a thermosetting material.

The substrate may further comprise fillers. The fillers may be organic and/or inorganic. The fillers may be one or more of: calcium carbonate, chalk, limestone, talc, stone dust, fly ash, wood dust, grounded risk husk, cork, and bamboo dust.

The laminated substrate may further comprise a protective layer arranged on the printed polymer based film.

The protective layer may be a polymer based film such a thermoplastic film or a thermosetting film.

BRIEF DESCRIPTION OF THE DRAWINGS

The present disclosure will by way of example be described in more detail with reference to the appended schematic drawings, which show embodiments of the present disclosure.

DETAILED DESCRIPTION

Figure 1A:
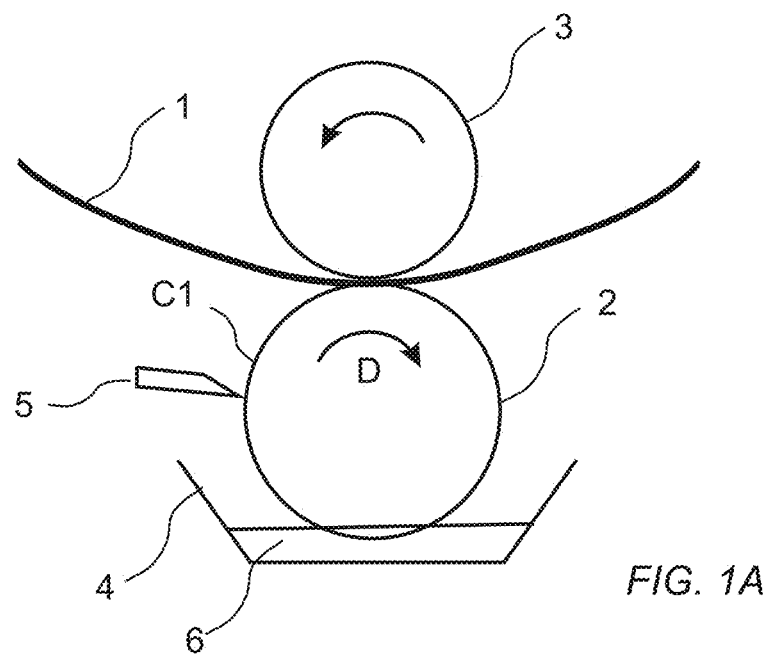
FIG. 1A shows schematically a rotogravure printing process of a polymer based film.

FIG. 1A shows schematically a rotogravure printing process in cross-section. In rotogravure printing, one or more gravure cylinders apply ink on the substrate to be printed. Conventionally, one gravure cylinder applies one colour. For CMYK, four gravure cylinders are included in the rotogravure printing process. In FIG. 1A, one gravure cylinder 2 is schematically shown in cross-section.

In rotogravure printing, ink 6 is placed in an ink tray 4 and the gravure cylinder 2 is immersed in the ink tray 4 to convey ink 6 from the ink tray 4 to the substrate to be printed. The gravure cylinder 2 is engraved with a pattern. A doctor blade 5 removes excess ink 6 from the gravure cylinder 2 such that ink 6 is only present in recesses of the engraved pattern of the gravure cylinder. The substrate passes between the gravure cylinder 2 and an impression roller 3. Thereby, ink 6 is transferred from the gravure cylinder 2 to a surface of the substrate. The process is repeated for every colour applied.

In the present disclosure, the substrate to be printed is a polymer based film 1. The polymer based film 1 may be a thermoplastic film. The polymer based film 1 may be a thermosetting film. In one example, the polymer based film 1 may be free from paper.

The polymer based film 1 may be of a polymeric material. The polymer material may be a thermoplastic or a thermoset.

The polymer based film 1 may be of, or comprise, polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof.

In one example, the polymer based film 1 is a PVC film. In another example, the polymer based film may be a thermosetting PU film.

The polymer based film 1 may have thickness of 0.01-0.1 mm.

The polymer based film 1 may have a rectangular shape, such as having a length and a width. The length may exceed the width of the polymer based film 1.

The polymer based film 1 may have a size substantially corresponding to the size of a substrate, to which the polymer based film 1 is to be applied in further step. The polymer based film 1 may have a width of 1-1.5 m, such as 1 m or 1.3 m.

In one example, the polymer based film 1 is printed by a rotogravure printing process as described above with reference to FIG. 1A. The polymer based film 1 is printed by a gravure cylinder 2 being engraved with at least two patterns. Said at least two patterns are subsequent each other as seen in a rotational direction D of the gravure cylinder 2. In one example, the gravure cylinder 1 is engraved with a first pattern and a second pattern. The second pattern 12 is subsequent the first pattern 11 as seen in the rotational direction D of gravure cylinder 1. Each of said patterns is unique and not equal or identical to another pattern.

The gravure cylinder 2 has a circumference C1. The gravure cylinder 2 has a rotation axis which may be arranged parallel to a width direction of the polymer based film 1 to be printed. The gravure cylinder 2 may have length extension parallel to the width direction of the polymer based film 1 to be printed. In the example wherein the gravure cylinder 2 is engraved with two individual patterns, i.e., the first pattern and the second pattern, a first half of the circumference C1 is engraved with the first pattern, and a second half of the circumference C1 is engraved with the second pattern.

Each of said at least two patterns may have an equal length.

Conventionally, the circumference C1 of the gravure cylinder 2 is less than the length of the polymer based film 1, such that said at least two patterns are repeated on the polymer based film 1. Said at least two patterns define a pattern repetition. A pattern repetition length substantially corresponds to the circumference C1 of the gravure cylinder 2.

When the polymer based film 1 has been printed, the polymer based film 1 is provided with a print comprising at least two patterns subsequent each other in the length direction of the polymer based film 1. In one example, the polymer based film 1 is printed with a print comprising the first pattern 11 and the second pattern 12, wherein the second pattern 12 is subsequent the first pattern 11 as seen in the length direction of the polymer based film 1.

In the above, the rotogravure printing has been described with reference to one gravure cylinder 2, but the skilled person understands that the process is repeated for each colour forming the print. Each gravure cylinder 1 in the rotogravure printing process has the same circumference C1.

Figure 1B:
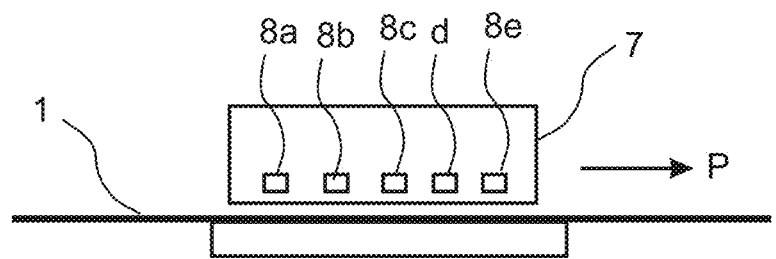
FIG. 1B shows schematically a digital printing process of a polymer based film.

Digital printing offers a more flexible printing process, compared to rotogravure printing wherein each individual design requires individual engraving of gravure cylinders 2. An example of a digital printing method is inkjet printing with an inkjet printer 7, which is shown schematically in FIG. 1B.

In an example of inkjet printing, the substrate to be printed is conveyed below a number of print bars 8a-e. In the present disclosure, the substrate to be printed is the polymer based film 1 described above with reference to FIG. 1A. The print bars 8a-e may extend transverse to the conveying direction, or printing direction, P. The print bars 8a-e may each comprise a number of ink-jet print heads. The inkjet print heads eject drops of ink on the substrate. The degree of freedom of the print is unlimited with digital printing, but if an embossed structure in register with the print is desired, costs for engraving a large number of embossing rollers limit the design possibilities. Thereby, even by digital printing, the print may be repeated over a length of the substrate to printed.

In the present disclosure, the polymer based film 1 may be digitally printed with a print or pattern having a pattern repetition. The pattern repetition may comprise at least two patterns subsequent each other in the length direction of the polymer based film 1. Each pattern of the pattern repetition is unique and is not identical or equal to another pattern of the pattern repetition. The pattern repetition has a pattern repetition length. The pattern repetition length may be defined as the distance, in the length direction of the printed polymer based film 1, from the beginning of the first pattern in the pattern repetition to the end of the last pattern in the pattern repetition.

In the following, examples wherein the pattern is a wood grain pattern will be described. However, in other examples, the pattern may be any type of pattern, such as a stone pattern, a tile pattern, a fantasy pattern, etc.

Figure 2A:
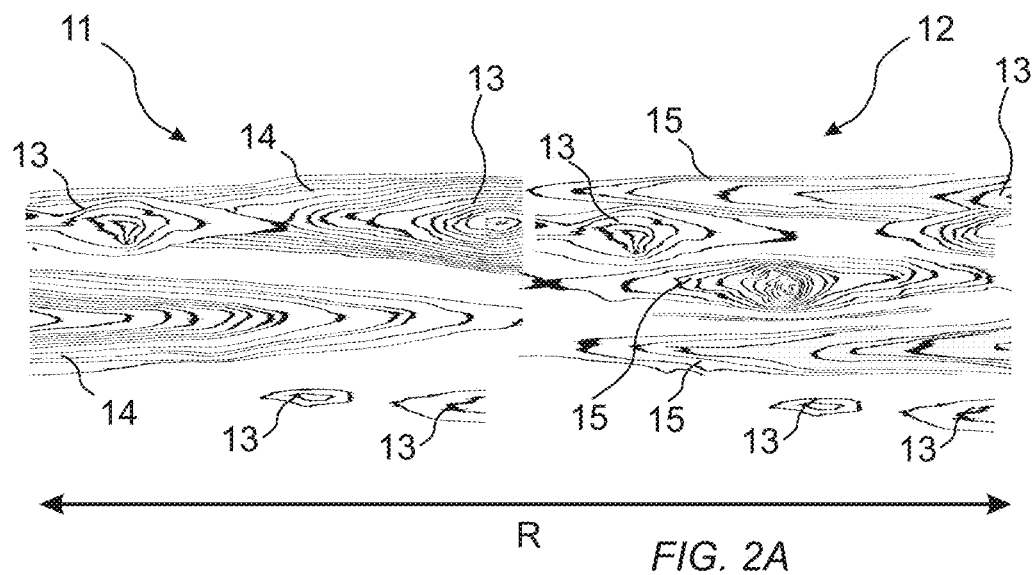
FIG. 2A shows a portion of a printed polymer based film, comprising a first pattern and a second pattern.

FIG. 2A shows a portion of the printed polymer based film 1. The printed polymer based film 1 may have been printed by a rotogravure printing process, as described above with reference to FIG. 1A, or may have been digitally printed, as described above with reference to FIG. 1B.

In the example shown in FIG. 2A, the polymer based film 1 is printed with two patterns in the length direction, the first pattern 11 and the second pattern 12. In other examples, the polymer based film 1 may be printed with any number of individual patterns exceeding two, such as 3-5 unique patterns, i.e., not being identical and subsequent each other in the length direction. Consequently, the pattern repetition may comprise at least two patterns in the length direction of the printed polymer based film 1.

In FIG. 2A, only a portion of the print of the polymer based film 1 is shown in the width direction of the polymer based film 1. The width of the print on the polymer based film 1 may be substantially the same as the width of the polymer based film 1. Consequently, only a portion of the first pattern 11 and of the second pattern 12 is shown in the width direction of the printed polymer based film 1. The first pattern 11 and the second pattern 12 can be seen as representing a set of first patterns and a set of second patterns, respectively.

FIG. 2A shows the first pattern 11 and the second pattern 12. The first pattern 11 is not identical to the second pattern 12. The first pattern 11 and the second pattern 12 form the pattern repetition, having the pattern repetition length R in the length direction of the printed polymer based film 1.

The first pattern 11 and the second pattern 12 may be formed by rotogravure printing, as described above with reference to FIG. 1A, or by digital printing such as inkjet printing as described above with reference to FIG. 1B. Irrespectively of the method, the resulting printed pattern may be substantially the same.

If the print shown in FIG. 2A is printed by rotogravure, the pattern repetition length R may substantially correspond to the circumference C1 of the gravure cylinder 2.

Figure 2B:
FIG. 2B shows a first set of design elements being identical for the first and second pattern.

The patterns shown in FIG. 2A will now be described in more details, and with reference to FIGS. 2B-2D. The first pattern 11 and the second pattern 12 each comprises a first set of design elements 13. The first set of design elements 13 are identical in the first pattern 11 and in the second pattern 12. The first set of design elements 13 are visualized in FIG. 2B. The design elements 13 being common for both the first pattern and the second pattern 12 may, for example, be knots and/or medullary rays.

The first pattern 11 and the second pattern 12 comprises a second set of design element 14, 15 not being identical. The second set of design element 14, 15 are unique for each pattern in the pattern repetition. In the example shown in FIGS. 2A-2D, the first pattern 11 comprises a second set of design elements in form of design elements 14. The design elements 14 of the first pattern 11 are visualized in FIG. 2C. The design elements 14 may, for example, be wood grains, as shown in FIG. 2C.

The second pattern 12 comprises a second set of design elements in form of design elements 15. The design elements 15 of the second pattern 12 are visualized in FIG. 2D. The design elements 15 may, for example, be wood grains, as shown in FIG. 2D.

Each pattern in the pattern repetition may have an equal length, as seen in the length direction of the printed polymer based film 1.

Returning to FIG. 2A, which shows the first pattern 11 and the second pattern 12 as visualized when including both the first set of design elements 13 and the second set of design elements 14, 15. Although the first pattern 11 and the second pattern 12 comprises common design elements, i.e., the first set of design elements 13, the first pattern 11 and the second pattern 12 are not identical.

The unique, i.e., non-identical, design elements 14, 15 for each pattern may be seen as forming a basic wood pattern, and wherein the common, i.e., identical design elements 13 adds certain features to the basic wood pattern, such as knots or medullary rays.

In an example wherein the pattern repetition comprises more than two patterns, each pattern in the pattern repetition comprises the first set of design elements 13. The first set of design elements 13 are identical for all patterns in the pattern repetition. However, each pattern in the pattern repetition comprises a second set of design elements, which are unique and non-identical. The second set of design elements is unique for each pattern in the pattern repetition.

The pattern of the printed polymer based film 1 is used for forming an embossing device. The embossing device may be an embossing roller or an embossing belt, as will be described below with reference to FIGS. 3 and 4. The embossing device is engraved with an embossing structure corresponding at least to the first set of design elements 13, such that after embossing, the embossed structure is in register with the first set of design elements 13. In one example, the embossing device is engraved with an embossing structure corresponding to one of the patterns in the pattern repetition, such as corresponding to the first pattern 11. Thereby, after embossing, the embossed structure is in register at least one of the patterns in the pattern repetition, such as being in register with the first pattern 11. The pattern of any of the patterns in the pattern repetition, such as the second pattern in FIGS. 2A-2D, is at least partly in register with the embossed structure, as the embossed structure is in register with the first set of design elements 13.

Figure 3:
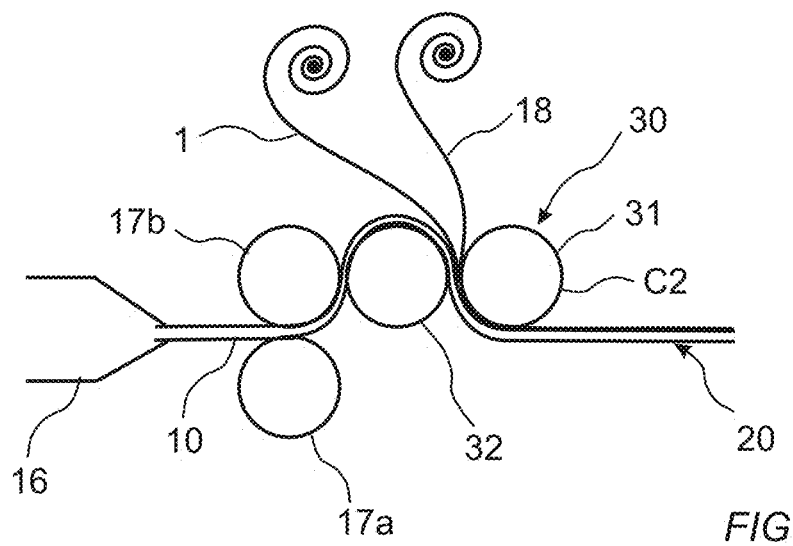
FIG. 3 shows schematically a process for forming a laminated substrate according to a first example.

FIG. 3 shows a continuous process for forming a laminated substrate. The layers of the laminated substrate may be applied and joined inline in the process.

In the process shown in FIG. 3, a substrate 10 is produced in an extrusion process by an extruder 16, or by a co-extruder. Thereby, the substrate 10 is an extruded substrate. The substrate 10 is formed in a continuous process.

The substrate 10 may have a rectangular shape, for example, having a length exceeding a width.

The substrate 10 may comprise a polymer material. The polymer material may be a thermoplastic or a thermoset. The polymer based material may be of, or comprise polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof. The substrate 10 may comprise 10-60 wt % of the polymer material.

The substrate 10 may further comprises fillers. The fillers may be organic and/or inorganic. The organic fillers may be wood dust, grounded risk husk, cork, bamboo dust. The inorganic fillers may be calcium carbonate, chalk, limestone, talc, stone dust, fly ash. The substrate 10 may comprise 30-90 wt % of said fillers.

The substrate 10 may further comprise additives, such as impact modifier, stabilizers, lubricants, pigments, foaming agent, and/or plasticizer. The substrate 10 may comprise 0-20 wt % additives.

In one example, the substrate 10 may comprise 10-30 wt % PVC, 50-90 wt % chalk, and 0-20 wt % additives. Such a substrate 10 may be of a type conventionally referred to as SPC.

A feeding speed of the continuous process comprising the extruder 16, or co-extruder, may be 0.5-12 m/min, such as 1-10 m/min or 1.5-9.0 m/min.

A barrel temperature of the extruder 16 may be 145-225° C. A barrel temperature of the extruder 16 may be 145-225° C. when extruding PVC. Alternatively, or additionally, an extrudate temperature directly after forming may be 90-280° C. When the substrate 10 comprising PVC, the extrudate temperature may be 90-225° C., preferably 145-220° C.

The substrate 10 may be calendered by passing one or more calender rollers 17a, 17b such that the substrate 10 obtains a desired thickness. After calendering, the substrate 10 may have a thickness of 2-10 mm. As an alternative or complement, the substrate 10 may be pressed to the desired thickness.

A feeding speed of the continuous process comprising the extruder 16, or co-extruder, and calender roller arrangement 17a, 17b may be 0.5-12 m/min, such as 1-10 m/min or 1.5-9.0 m/min.

After calendering, the substrate 10 may be feed over a roller 32.

After calendering, the printed polymer based film 1 described above with reference to FIGS. 1A, 1B and 2 is applied on a first surface of the substrate 10. The polymer based film 1 may have been printed by rotogravure printing as described above with reference to FIG. 1A, or may have been printed by digital printing as described above with reference to FIG. 1B.

The printed polymer based film 1 may be applied to the substrate 10 prior to cooling the substrate 10.

The printed polymer based film 1 may be applied on the substrate 10 such as that the length direction of the printed polymer based film 1 is substantially parallel to a length direction of the substrate 10.

In FIG. 3, a protective layer 18 is applied on the printed polymer based film 1. The protective layer 18 may be a protective film, such as a polymer based film. The polymeric material of the protective film may be a thermoplastic or a thermoset. The polymer based film may be of, or comprise polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof.

The protective layer 18 may have a thickness of 0.1-2 mm.

Optionally, a backing layer (not shown) may be applied to a second surface of the substrate 10, opposite the printed polymer based film 1.

The substrate 10, the printed polymer based film 1, and optionally the protective layer 18 and backing layer is adhered to each by applying pressure, for example in a pressing and embossing device 30. In the example shown in FIG. 3, the pressing and embossing device 30 comprises rollers 31 and 32. Heat may also be applied during pressing.

After pressure has been applied by the rollers 31 and 32, a laminated substrate 20 is obtained. The laminated substrate 20 comprises the substrate 10 and the printed polymer based film 1. The laminated substrate 20 may optionally further comprise the protective layer 18 and the backing layer.

In the pressing and embossing device 30, the laminated substrate 20 is provided with an embossed structure by the embossing roller 31. The embossing roller 31 is configured to emboss the laminated substrate 20 with an embossed structure.

The pressing roller 32 may apply counter pressure to the second surface of the substrate 10, opposite the printed polymer based film 1.

The embossing roller 31 is engraved with the embossed structure. The embossing roller 31 has a circumference C2. The circumference C2 of the embossing roller 31 is engraved with the embossed structure.

The embossing roller 31 may have a rotation axis which may be arranged parallel to a width direction of the printed polymer based film 1. The embossing roller 31 may have length extension parallel to the width direction of the printed polymer based film 1. The embossing roller 31 may have a rotation axis substantially transverse to the length direction of the polymer based film 1. The embossing roller 31 may have a rotation axis substantially parallel to the rotation axis of gravure cylinder 2.

In the example wherein the polymer based film 1 has been printed by rotogravure, the circumference C1 of the gravure cylinder 2 exceeds the circumference C2 of the embossing roller 31. The circumference C1 of the gravure cylinder C1 divided by the circumference C2 of the embossing roller 31 substantially corresponds to an integer n.

The integer n substantially corresponds to the number of patterns of the gravure cylinder 2, as seen in the rotational direction of the gravure cylinder 2. If the gravure cylinder 2 comprises three patterns subsequent each other in the rotational direction of the gravure cylinder 2, the circumference C1 of the gravure cylinder is substantially 3 times the circumference C2 of the embossing roller 31.

In other words, irrespectively of the printing method, the pattern repetition length R, in the length direction of the printed polymer based film 1, divided by the circumference C2 of the embossing roller 31 substantially corresponds to an integer n. The integer n exceeds 1, such as n>1. The polymer based film 1 may have been printed by rotogravure, or by a digital printing method.

As described above, the integer n substantially corresponds to the number of patterns on the gravure cylinder 2 in the rotational direction thereof. In rotogravure, the circumference C1 of the gravure cylinder 2 corresponds to the pattern repetition length R.

In a digital printing method, the integer n corresponds to the number of patterns included in the pattern repetition, subsequent each other in the length direction of the polymer based film 1. If the pattern repetition includes 4 patterns in the length direction of the printed polymer based film 1, the pattern repetition length R is substantially 4 times the circumference C2 of the embossing roller 31.

By substantially corresponds is understood to mean that the number may be close to an integer, such as being the integer n+/−0.01. A reason for this is that consideration may have to be taken to a distance required for dividing the laminated substrate 20 into individual panels, and/or a distance required for machining a mechanical locking system along edges of the panels.

By the number n being substantially an integer, the embossed structure can be matched with the patterns. By the number n being substantially an integer, the embossed structure may be less than 5 mm off the printed pattern. Preferably, the resulting embossed structure may be less than 2 mm off the printed pattern.

The same embossing roller 31 can be used to emboss a number of different patterns.

The embossing structure of the embossing roller 31 is at least corresponding to the first set of design elements 13 of the printed patterns. Thereby, the embossed structure of the laminated substrate 20 is at least in register with the first set of design elements 13, which are common for all patterns.

In one example, at least one pattern of the patterns in the pattern repetition is in register with the embossed structure of the embossing roller 31. For example, the embossed roller 31 may be engraved with a pattern corresponding to the first pattern 11. Thereby, the embossed structure is in register with the first pattern 11. Any other pattern is at least partly in register with the embossed structure.

By including a common set of design elements 13 in the patterns, at least some of design elements of the pattern is in register with the embossed structure. Thereby, an impression of an embossed structure being in register with the patterns can be obtained.

By designing the patterns with at least some elements in common between the patterns in the pattern repetition but with other elements not being identical between the patterns, the embossed structure can be partly in register with the patterns. The visual impression may be that the embossed structure is in register with the patterns, and that the patterns are not identical to each other.

After embossing, an embossed laminated substrate 20 is obtained. The laminated substrate 20 may be further divided into panels, which will be described with reference to FIGS. 6-8.

Figure 4:
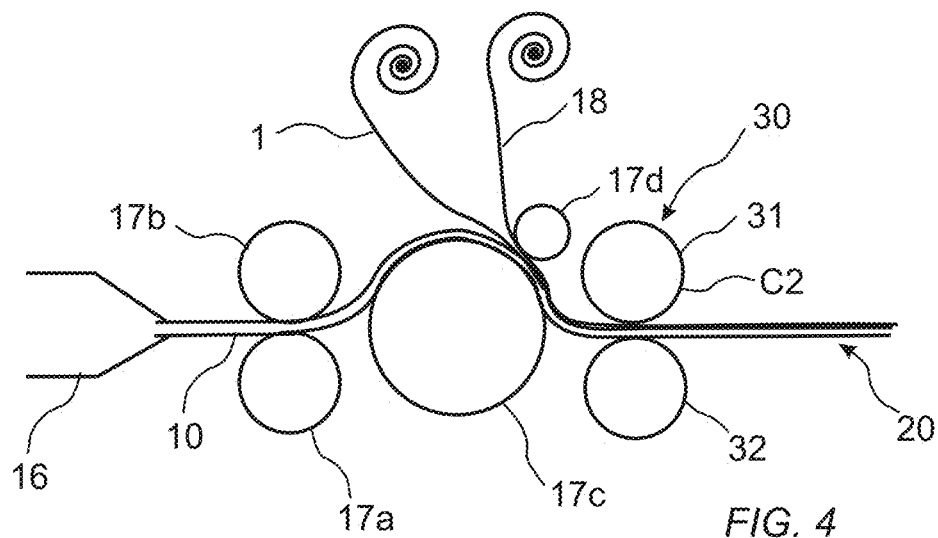
FIG. 4 shows schematically a process for forming a laminated substrate according to a second example.

FIG. 4 shows an example of a continuous process similar to the process in FIG. 3. In FIG. 4, the arrangement of rollers is different from the arrangement of rollers in FIG. 3. In all other aspects, the disclosure above for FIG. 3 is applicable also for the example in FIG. 4. In FIG. 4, after extrusion, the substrate 10 of the above the described type is calendered by passing one or more calender rollers 17*a*, 17*b* such that the substrate 10 obtains a desired thickness. The substrate 10 is thereafter feed over roller 17*c*. The printed polymer based film 1 of the above described type and the optional protective layer 18 is applied to the substrate 10 and fed between the rollers 17*c* and 17*d*.

As described above, the substrate 10, the printed polymer based film 1, and optionally the protective layer 18 and backing layer is adhered to each by applying pressure, for example in a pressing and embossing device 30. In the example shown in FIG. 4, the pressing and embossing device 30 comprises rollers 31 and 32. Heat may also be applied during pressing.

After pressure has been applied by the rollers 31 and 32, a laminated substrate 20 is obtained. The laminated substrate 20 comprises the substrate 10 and the printed polymer based film 1. The laminated substrate 20 may optionally further comprise the protective layer 18 and the backing layer.

In the pressing and embossing device 30, the laminated substrate 20 is provided with an embossed structure by the embossing roller 31. The embossing roller 31 is configured to emboss the laminated substrate 20 with an embossed structure.

The pressing roller 32 may apply counter pressure on the second surface of the substrate 10, opposite the printed polymer based film 1.

The embossing roller 31 is engraved with the embossed structure. The embossing roller 31 has a circumference C2. The circumference C2 of the embossing roller 31 is engraved with the embossed structure. The embossing roller 31 may correspond to the embossing roller in FIG. 3, and the disclosure with reference to FIG. 3 is applicable also for the embossing roller in FIG. 4.

Figure 5:
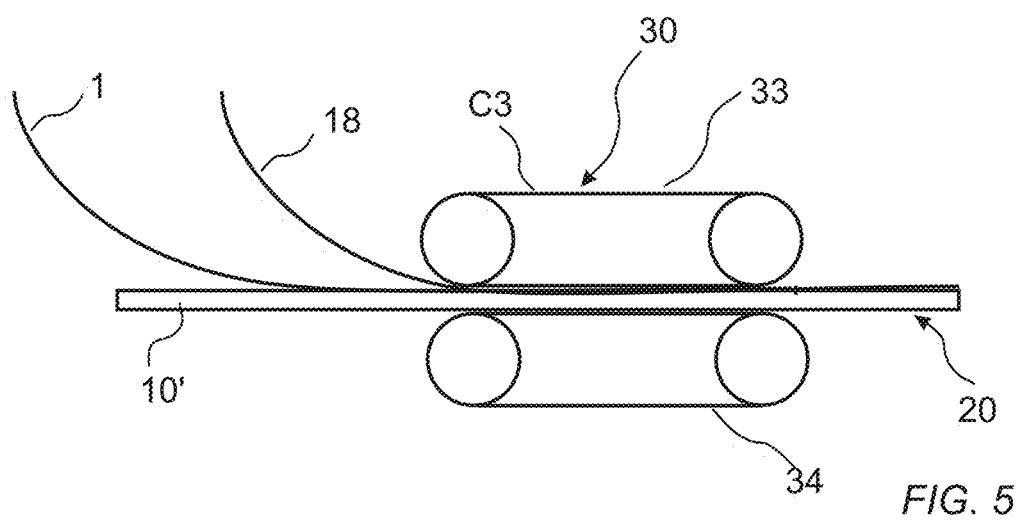
FIG. 5 shows schematically a process for forming a laminated substrate according to a third example.

FIG. 5 shows another example of a process for forming a laminated substrate. In the process shown in FIG. 5, a substrate 10' is provided. The substrate 10' may be formed in a prior process. The substrate 10' may be pressed, for example by calendering a number of layers, which together form the substrate 10'.

The substrate 10' may comprise a polymer material. The polymer material may be a thermoplastic or a thermoset. The polymer based material may be of, or comprise polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof. The substrate 10' may comprise 10-60 wt % of the polymer material.

The substrate 10' may further comprises fillers. The fillers may be organic and/or inorganic. The organic fillers may be wood dust, grounded risk husk, cork, bamboo dust. The inorganic fillers may be calcium carbonate, chalk, limestone, talc, stone dust, fly ash. The substrate 10' may comprise 30-90 wt % of said fillers. The substrate 10' may comprise 30-90 wt % of said fillers.

The substrate 10' may further comprise additives, such as impact modifier, stabilizers, lubricants, pigments, foaming agent, and/or plasticizer. The substrate 10' may comprise 0-20 wt % additives.

The substrate 10' may have a thickness of 2-10 mm.

In one example, the substrate 10 may comprise 10-30 wt % PVC, 50-90 wt % chalk, and 0-20 wt % additives. Such a substrate 10 may be of a type conventionally referred to as SPC.

The printed polymer based film 1 described above is applied on a first surface of the substrate 10. The polymer based film 1 may have been printed by rotogravure printing as described above with reference to FIG. 1A, or may have been printed by digital printing as described above with reference to FIG. 1B.

The printed polymer based film 1 may be applied on the substrate 10' such as that the length direction of the printed polymer based film 1 is substantially parallel to a length direction of the substrate 10'.

In FIG. 5, a protective layer 18 is applied on the printed polymer based film 1. The protective layer 18 may be a protective film, such as a polymer based film. The polymeric material of the protective film may be a thermoplastic or a thermoset. The polymer based film may be of, or comprise polyvinyl chloride (PVC), polyester, polypropylene (PP), polyethylene (PE), polystyrene (PS), thermoplastic polyurethane (PU), thermosetting polyurethane (PU), polyethylene terephthalate (PET), polyacrylate, methacrylate, polycarbonate, polyvinyl butyral, polybutylene terephthalate, or a combination thereof.

The protective layer 18 may have a thickness of 0.1-2 mm.

Optionally, a backing layer (not shown) may be applied to a second surface of the substrate 10', opposite the printed polymer based film 1.

The substrate 10', the printed polymer based film 1, and optionally the protective layer 18 and backing layer is adhered to each by applying pressure, for example in a pressing device 30. In the example shown in FIG. 5, the pressing device 30 comprises a double belt press 33, 34. Heat may also be applied during pressing.

The upper belt 33 of the double belt press is provided with an embossed structure, such that pressing and embossing takes place in one process step.

After passing the pressing device 30, a laminated substrate 20 has been obtained. The laminated substrate 20 comprises the substrate 10' and the printed polymer based film 1. The laminated substrate 20 may optionally further comprise the protective layer 18 and the backing layer. The laminated substrate 20 is provided with an embossed structure.

In the example shown in FIG. 5, embossing takes place simultaneously as pressing, and thereby, forming the laminated substrate 20.

The embossed structure of the upper press belt 33 is configured to emboss the laminated substrate 20 with an embossed structure. The uppermost layer may be the printed polymer based film 1.

The embossed press belt 33 has a perimeter C3. The embossed press belt 33 is engraved with the embossed structure. The perimeter C3 of the embossed press belt 33 is engraved with the embossed structure. The perimeter C3 of the embossed press belt 33 may be defined as the length of the surface intended to contact the uppermost layer of the laminated substrate 20.

The embossed press belt 33 has a length extension parallel to the length direction of the printed polymer based film 1.

In the example wherein the polymer based film 1 has been printed by rotogravure, the circumference C1 of the gravure cylinder 2 exceeds the perimeter C3 of the embossed press belt 33. The circumference C1 of the gravure cylinder C1 divided by the perimeter C3 of the embossed press belt 33 substantially corresponds to an integer n.

The integer n substantially corresponds to the number of patterns of the gravure cylinder 2, as seen in the rotational direction of the gravure cylinder 2. If the gravure cylinder 2 comprises three patterns subsequent each other in the rotational direction of the gravure cylinder 2, the circumference C1 of the gravure cylinder is substantially 3 times the perimeter C3 of the embossed press belt 33.

In other words, irrespectively of the printing method, the pattern repetition length R, in the length direction of the printed polymer based film 1, divided by the perimeter C3 of the embossed press belt 33 substantially corresponds to an integer n. The integer n exceeds 1, such as n>1. The polymer based film 1 may have been printed by rotogravure, or by a digital printing method.

As described above, the integer n substantially corresponds to the number of patterns on the gravure cylinder 2 in the rotational direction thereof. In rotogravure, the circumference C1 of the gravure cylinder 2 corresponds to the pattern repetition length R.

In a digital printing method, the integer n corresponds to the number of patterns included in the pattern repetition, subsequent each other in the length direction. If the pattern repetition includes 4 patterns in the length direction of the printed polymer based film 1, the pattern repetition length R is substantially 4 times the perimeter C3 of the embossed press belt 33.

By substantially corresponds may is understood to mean that the number may be close to an integer, such as being the integer n+/−0.01. A reason for this is the consideration may have to be taken to a distance required for dividing the laminated substrate 20 into individual panels, and/or a distance required for machining a mechanical locking system along edges of the panels.

By the number n being substantially an integer, the embossed structure can be matched with the patterns. By the number n being substantially an integer, the embossed structure may be less than 5 mm off the printed pattern. Preferably, the resulting embossed structure may be less than 2 mm off the printed pattern.

The same embossed press belt 33 can be used to emboss a number of different patterns.

The embossing structure of the embossed press belt 33 is at least corresponding to the first set of design elements 13 of the printed pattern. Thereby, the embossed structure of the laminated substrate 20 is at least in register with the first set of design elements 13, which are common for all patterns in the pattern repetition.

In one example, at least one pattern of the patterns in the pattern repetition is in register with the embossed structure of the embossed press belt 33. For example, the embossed press belt 33 may be engraved with a pattern corresponding to the first pattern 11. Thereby, the embossed structure is in register with the first pattern 11. Any other pattern is at least partly in register with the embossed structure.

By including a common set of design elements 13 in the patterns, at least some of design elements of the pattern is in register with the embossed structure. Thereby, an impression of an embossed structure being in register with the pattern can be obtained.

By designing the patterns with at least some elements in common between the patterns but with other elements not being identical between the patterns, the embossed structure is partly in register with the patterns. The visual impression may be that the embossed structure is in register with the patterns, and that the patterns are not identical to each other.

After embossing, an embossed laminated substrate 20 is obtained. The laminated substrate 20 may be further divided into panels, which will be described with reference to FIGS. 6-8.

After embossing, a coating (not shown) may be applied to the printed polymer film 1, or to the protective layer 18 if such a layer has been applied.

Figure 6:
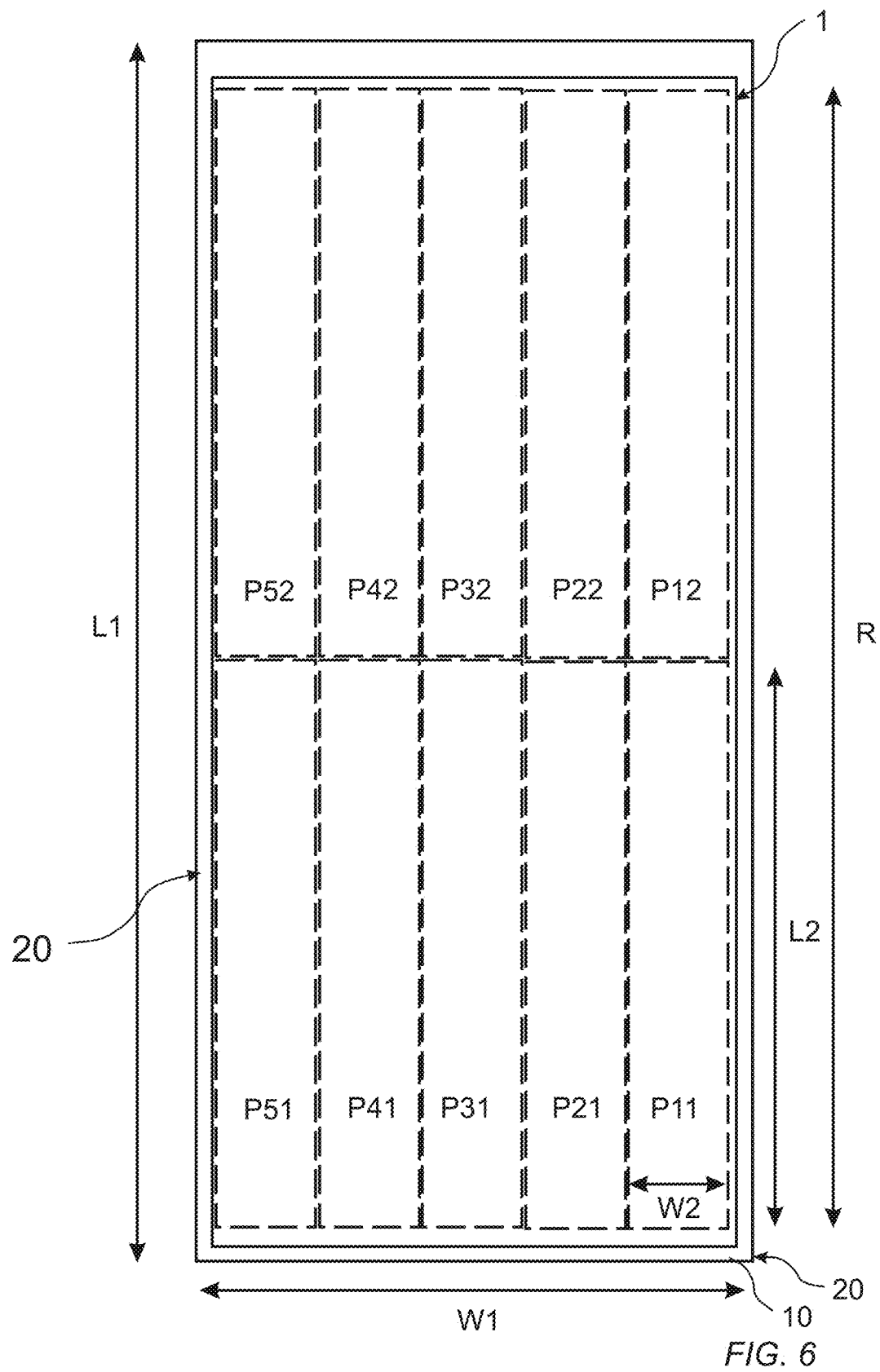
FIG. 6 shows a top view of the laminated substrate according to a first example.

FIG. 6 shows an example of the laminated substrate 20 after pressing and embossing as seen from above. The laminated substrate 20 comprises the substrate 10 or substrate 10' and the printed polymer based film 1. The laminated substrate 20 may be formed by any other the methods described above with reference to FIGS. 3-5. A planar extension of the polymer based film 1 substantially corresponds to a planar extension of the substrate 10. In the example shown in FIG. 6, the laminated substrate 20 has rectangular shape, having a length L1 and a width W1. In the example shown in FIG. 6, the length L1 is exceeding the width W1 of the laminated substrate 20. The length direction of the polymer based film 1 is substantially parallel with the length direction of the substrate 10.

The laminated substrate 20 is intended to be divided into panels, which are shown with dashed line in FIG. 6. The panels may be tiles or planks. In the example shown in FIG. 6, the panels are plank-shaped, i.e., having a length L2 exceeding a width W2. In the example shown in FIG. 6, the length direction of the planks is substantially parallel to the length direction of the laminated substrate 20.

In the example shown in FIG. 6, the polymer based film 1 is printed with a print having a pattern repetition comprising a set of first patterns P11, P21, P31, P41, P51 and a set of second patterns P12, P22, P32, P42, P52. The set of second patterns P12, P22, P32, P42, P52 being subsequent the first set of first patterns P11, P21, P31, P41, P51 in in the length direction L1 of the laminated substrate 20. The patterns in the set of first patterns P11, P21, P31, P41, P51 are subsequent each other the width direction of the printed polymer based film 1. The patterns in the set of second patterns P12, P22, P32, P42, P52 are subsequent each other the width direction of the printed polymer based film 1.

Figure 2C:
FIG. 2C shows a second set of design elements of the first pattern.
Figure 2D:
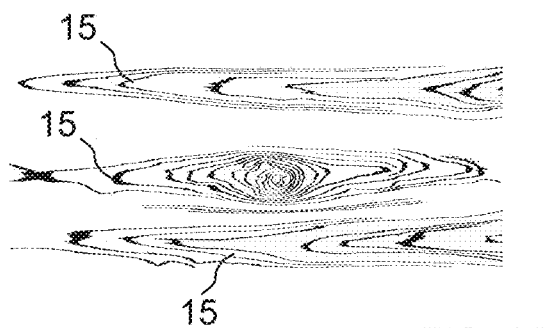
FIG. 2D shows a second set of design elements of the second pattern.

As an example, the first pattern P11 may be the first pattern 11 in FIGS. 2A and 2C. The second pattern P12 may be the second pattern 12 in FIGS. 2A and 2D. The pattern repetition has the pattern repetition length R in the length direction L1 of the laminated substrate 20.

The printed polymer based film 1 in FIG. 6 is printed with one pattern repetition. In the example shown in FIG. 6, each pattern repetition comprises five patterns subsequent each other in the width direction. In total, the pattern repetition may comprise ten non-identical patterns.

As seen in the length direction of the printed polymer based film 1, each pattern in the pattern repetition is unique, and not identical or equal to another pattern in the pattern repetition in the length direction.

As seen in the width direction of the printed polymer based film 1, each pattern in the pattern repetition may be unique. In one example, the patterns in width direction may be similar.

If the polymer based film 1 in FIG. 6 has been printed by rotogravure, as described with reference to FIG. 1A, the gravure cylinder 2 has been with engraved two patterns subsequent each other in the rotational direction of the gravure cylinder and five patterns subsequent each other in a direction parallel to the rotational axis of the gravure cylinder 2.

As described above with reference to FIGS. 3, 4 and 5, the laminated substrate 20 has been embossed with the embossing device 30. In the example shown in FIG. 6, the integer n is 2. The integer n corresponds to the number of patterns in the pattern repetition, as seen in the length direction of the printed polymer based film 1. In the example shown in FIG. 6, the pattern repetition length R is twice the perimeter of the embossing device 30.

The embossed structure is in register with at least a first set of design elements being common for all patterns in the pattern repetition subsequent each other in the length direction. In one example, the embossed structure is in register with the set of first patterns P11, P21, P31, P41, P51, subsequent each other in the width direction. The embossed structure is at least partly in register with the set of second patterns P12, P22, P32, P42, P52, subsequent each other in the width direction and subsequent the set of first patterns P11, P21, P31, P41, P51 in the length direction. For example, the embossed structure is in register with the first set of design elements 13 which are common to both the set of first patterns P11, P21, P31, P41, P51 and the set of second patterns P12, P22, P32, P42, P52. Thereby, the print may be varied with an embossed structure at least being partly in register with the print, without producing unique embossing devices for each pattern.

The laminated substrate 20 may be divided into panels, as mentioned above and shown in dashed lines in FIG. 6. The length of the panel may substantially correspond to the length of the pattern. All panels may have an equal length.

The length of the panel may substantially correspond to the perimeter C2, C3 of the embossing device 30. If the embossing roller 31 is used, the circumference C2 of the embossing roller 31 substantially correspond to the length of the panel. If the embossing press belt 33 is used, the perimeter C3 of the embossing press belt 33 substantially correspond to the length of the panel.

In the example shown in FIG. 6, the laminated substrate 20 is intended to be divided into 10 panels. All 10 panels have unique patterns, wherein the patterns at least are partly in register with the embossed structure. In known solutions, only 5 unique panels with patterns in register with the embossed structure is obtained.

In one example, the panels may have a width of 178 mm and a length of 1219 mm (7×48″). If extruding the substrate 10 in an extruder having a width of approximately 1 m, 5 panels having a width of 178 mm may be provided side by side in the width direction of the substrate 10, as shown in FIG. 6. The panels shown in FIG. 7 may have a length of 1219 mm.

If an extruder having a width of approximately 1.3 m is used for extruding the substrate 10, 7 panels having a width of 178 mm may be provided side by side in the width direction of the substrate 10. Correspondingly, such a laminated substrate may be intended to be divided into 28 panels, wherein 14 panels have unique patterns, wherein the pattern at least is partly in register with the embossed structure.

In another example, the panels may have a width of 305 mm and a length of 610 mm (12×24″).

In further examples, the panels may have a width of 229 mm and a length of 1524 mm (9×60″). In other examples, the panels may be tiles having a width and length of 457 mm (18×18″).

Figure 7:
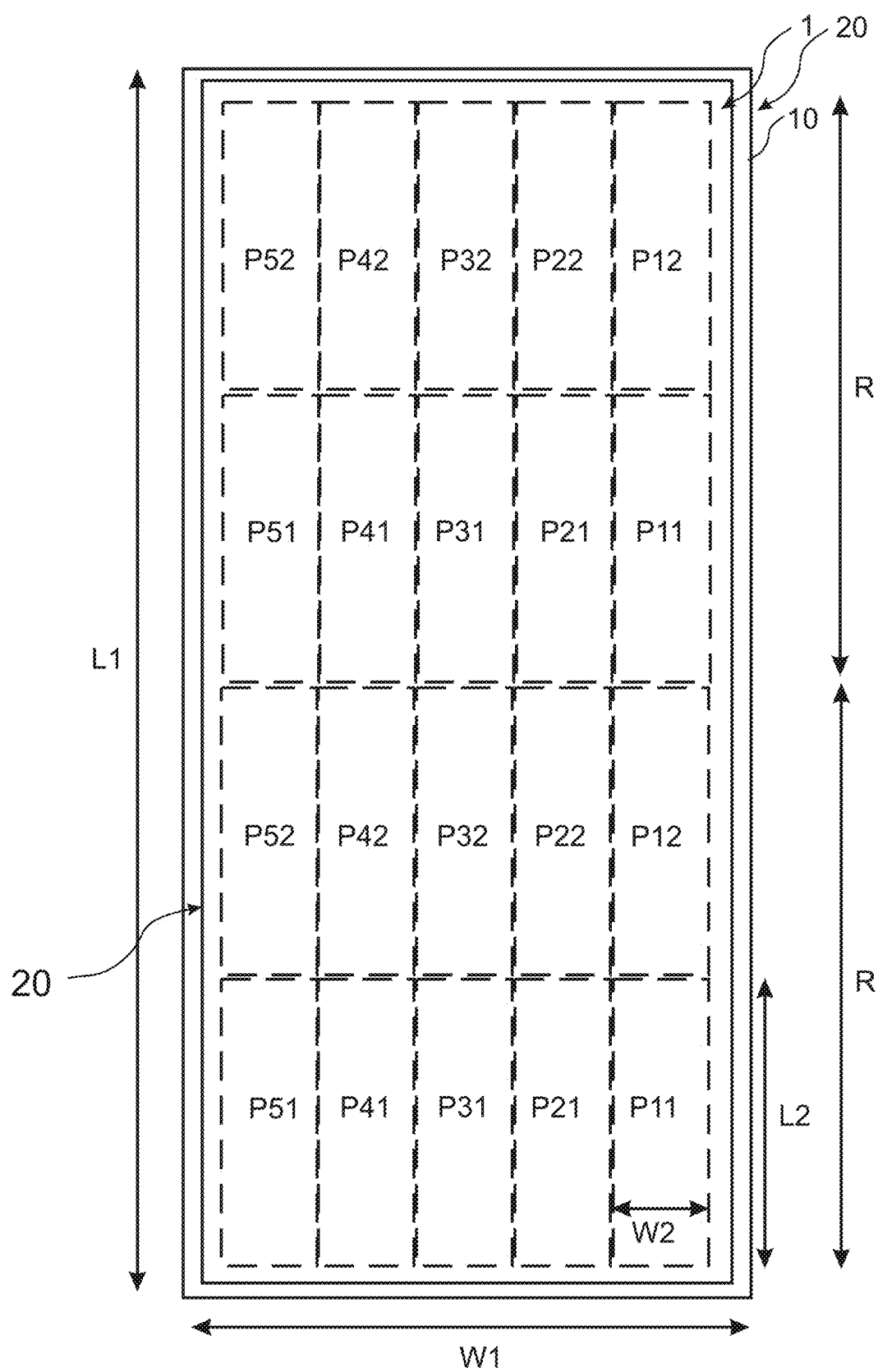
FIG. 7 shows a top view of the laminated substrate according to a second example.

FIG. 7 shows an example of the laminated substrate 20 after pressing and embossing as seen from above. The laminated substrate 20 comprises the substrate 10 or substrate 10' and the printed polymer based film 1. The laminated substrate 20 may be formed by any of the methods described above with reference to FIGS. 3-5. A planar extension of the polymer based film 1 substantially corresponds to a planar extension of the substrate 10. In the example shown in FIG. 7, the laminated substrate 20 has rectangular shape, having a length L1 and a width W1. In the example shown in FIG. 7, the length L1 is exceeding the width W1 of the laminated substrate 20. The length direction of the polymer based film 1 is substantially parallel with the length direction of the substrate 10.

The laminated substrate 20 is intended to be divided into panels, which are shown with dashed line in FIG. 7. The panels may be tiles or planks. In the example shown in FIG. 7, the panels are plank-shaped, i.e., having a length L2 exceeding a width W2. In the example shown in FIG. 7, the length direction of the planks is substantially parallel to the length direction L1 of the laminated substrate 20.

In the example shown in FIG. 7, the polymer based film 1 is printed with a print having a pattern repetition comprising a set of first patterns P11, P21, P31, P41, P51 and a set of second patterns P12, P22, P32, P42, P52. The set of second patterns P12, P22, P32, P42, P52 are subsequent the first set of first patterns P11, P21, P31, P41, P51 in in the length direction of the laminated substrate 20. The patterns in the set of first patterns P11, P21, P31, P41, P51 are subsequent each other the width direction of the printed polymer based film 1. The patterns in the set of second patterns P12, P22, P32, P42, P52 are subsequent each other the width direction of the printed polymer based film 1.

As an example, the first pattern P11 may be the first pattern 11 in FIGS. 2A and 2C. The second pattern P12 may be the second pattern 12 in FIGS. 2A and 2D. The pattern repetition has the pattern repetition length R in the length direction L1 of the laminated substrate 20.

The printed polymer based film 1 in FIG. 7 is printed with two pattern repetitions. In the example shown in FIG. 7, each pattern repetition comprises two patterns subsequent each other in the length direction, and five patterns subsequent each other in the width direction. In total, the pattern repetition may comprise ten non-identical patterns.

As seen in the length direction of the printed polymer based film 1, each pattern in the pattern repetition is unique, and not identical or equal to another pattern in the pattern repetition in the length direction.

As seen in the width direction of the printed polymer based film 1, each pattern in the pattern repetition may be unique. In one example, the patterns in the width direction may be similar.

If the polymer based film 1 in FIG. 7 has been printed by rotogravure, as described with reference to FIG. 1A, the gravure cylinder 2 has been with engraved two patterns subsequent each other in the rotational direction of the gravure cylinder and five patterns subsequent each other in a direction parallel to the rotational axis of the gravure cylinder 2.

As described above with reference to FIGS. 3, 4 and 5, the laminated substrate 20 has been embossed with the embossing device 30. In the example shown in FIG. 7, the integer n is 2. The integer n corresponds to the number of patterns in the pattern repetition, as seen in the length direction of the printed polymer based film 1. In the example shown in FIG. 7, the pattern repetition length R is twice the perimeter of the embossing device 30.

The embossed structure is in register with at least a first set of design elements being common for all patterns in the pattern repetition subsequent each other in the length direction. In one example, the embossed structure is in register with the set of first patterns P11, P21, P31, P41, P51, subsequent each other in the width direction. The embossed structure is at least partly in register with the set of second patterns P12, P22, P32, P42, P52, subsequent each other in the width direction and subsequent the set of first patterns P11, P21, P31, P41, P51 in the length direction. For example, the embossed structure is in register with the first set of design elements 13 which are common to both the set of first patterns P11, P21, P31, P41, P51 and the set of second patterns P12, P22, P32, P42, P52. Thereby, the print may be varied with an embossed structure at least being partly in register with the print, without producing unique embossing devices for each pattern.

The laminated substrate 20 may be divided into panels, as mentioned above and shown in dashed lines in FIG. 7. The length of the panel may substantially correspond to the length of the pattern. All panels may have an equal length.

The length of the panel may substantially correspond to the perimeter C2, C3 of the embossing device 30. If the embossing roller 31 is used, the circumference C2 of the embossing roller 31 substantially correspond to the length of the panel. If the embossing press belt 33 is used, the perimeter C3 of the embossing press belt 33 substantially correspond to the length of the panel.

In the example shown in FIG. 7, the laminated substrate 20 is intended to be divided into 20 panels. 10 of the 20 panel have unique patterns, wherein the patterns at least are partly in register with the embossed structure.

In one example, the panels may have a width of 178 mm and a length of 1219 mm (7×48"). If extruding the substrate 10 in an extruder having a width of approximately 1 m, 5 panels having a width of 178 mm may be provided side by side in the width direction of the substrate 10, as shown in FIG. 7.

If an extruder having a width of approximately 1.3 m is used for extruding the substrate 10, 7 panels having a width of 178 mm may be provided side by side in the width direction of the substrate 10. Correspondingly, such a laminated substrate may be intended to be divided into 28 panels, wherein 14 panels have unique patterns, wherein the pattern at least is partly in register with the embossed structure.

In another example, the panels may have a width of 305 mm and a length of 610 mm (12×24").

In further examples, the panels may have a width of 229 mm and a length of 1524 mm (9×60"). In other examples, the panels may be tiles having a width and length of 457 mm (18×18").

Figure 8:
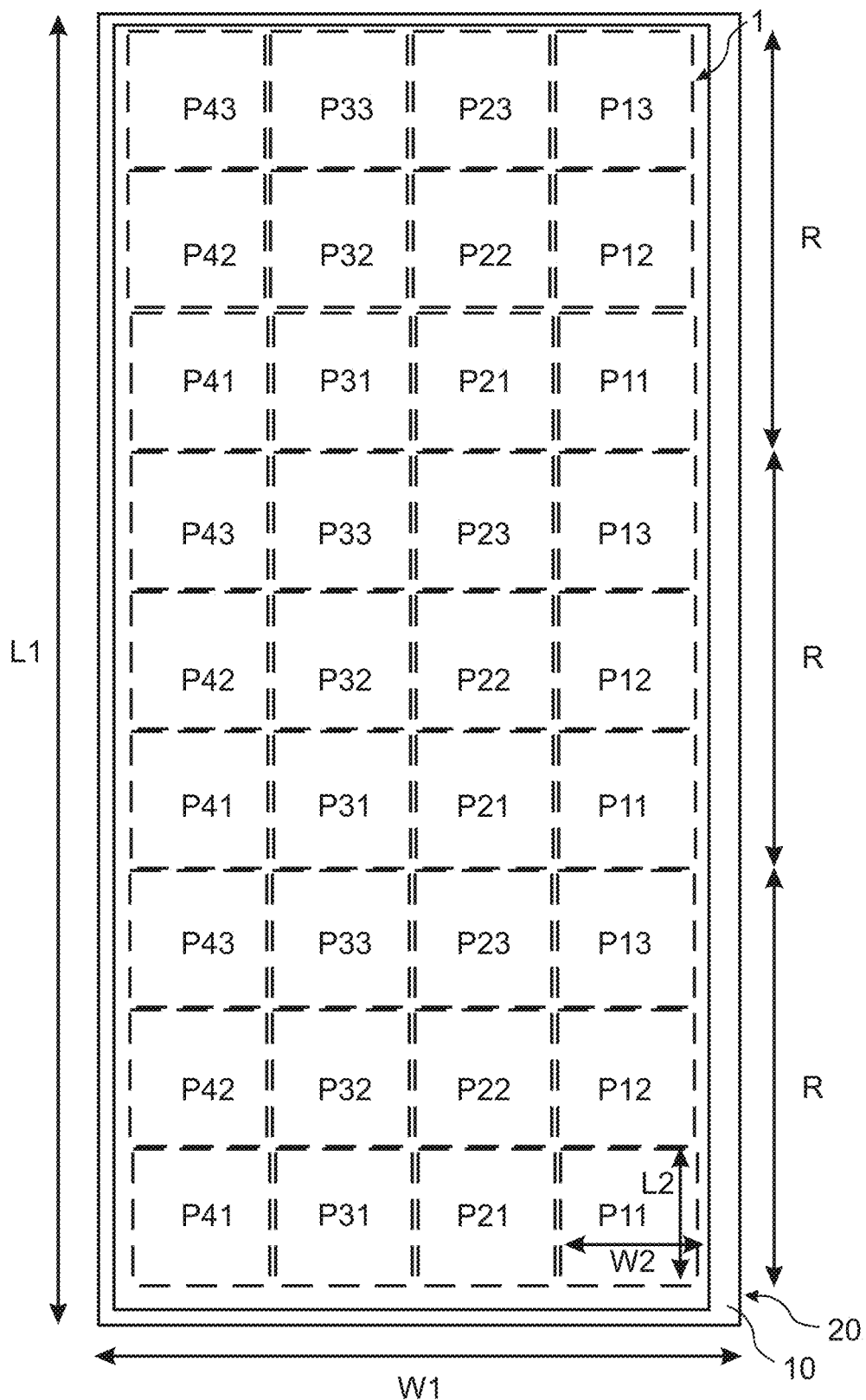
FIG. 8 shows a top view of the laminated substrate according to a third example.

FIG. 8 shows an example of the laminated substrate 20 after pressing and embossing as seen from above. The laminated substrate 20 comprises the substrate 10 or substrate 10' and the printed polymer based film 1. The laminated substrate 20 may be formed by any of the methods described above with reference to FIGS. 3-5. A planar extension of the polymer based film 1 substantially corresponds to a planar extension of the substrate 10. In the example shown in FIG. 8, the laminated substrate 20 has rectangular shape, having a length L1 and a width W1. In the example shown in FIG. 8, the length L1 is exceeding the width W1 of the laminated substrate 20. The length direction of the polymer based film 1 is substantially parallel with the length direction of the substrate 10.

The laminated substrate 20 is intended to be divided into panels, which are shown with dashed line in FIG. 8. The panels may be tiles or planks. In the example shown in FIG. 8, the panels are tile-shaped, i.e., having a length L2 being similar to the width W2.

In the example shown in FIG. 8, the polymer based film 1 is printed with a print having a pattern repetition comprising a set of first patterns P11, P21, P31, P41, a set of second patterns P12, P22, P32, P42 and a set of third patterns P13, P23, P33, P43. The sets of patterns are subsequent each other in the length direction L1 of the laminated substrate 20. The patterns in each set are subsequent each other the width direction of the printed polymer based film 1.

As an example, the first pattern P11 may be the first pattern 11 in FIGS. 2A and 2C. The second pattern P12 may be the second pattern 12 in FIGS. 2A and 2D. The pattern repetition has the pattern repetition length R in the length direction of the laminated substrate 20.

The printed polymer based film 1 in FIG. 8 is printed with three pattern repetitions. In the example shown in FIG. 8, each pattern repetition comprises three patterns subsequent each other in the length direction, and four patterns subsequent each other in the width direction. In total, the pattern repetition may comprise 12 non-identical patterns.

As seen in the length direction of the printed polymer based film 1, each pattern in the pattern repetition is unique, and not identical or equal to another pattern in the pattern repetition in the length direction.

As seen in the width direction of the printed polymer based film 1, each pattern in the pattern repetition may be unique. In one example, the patterns in width direction may be similar.

If the polymer based film 1 in FIG. 8 has been printed by rotogravure, as described with reference to FIG. 1A, the gravure cylinder 2 has been with engraved three patterns subsequent each other in the rotational direction of the gravure cylinder and four patterns subsequent each other in a direction parallel to the rotational axis of the gravure cylinder 2.

As described above with reference to FIGS. 3, 4 and 5, the laminated substrate 20 has been embossed with the embossing device 30. In the example shown in FIG. 8, the integer n is 3. The integer n corresponds to the number of patterns in the pattern repetition, as seen in the length direction of the printed polymer based film 1. In the example shown in FIG. 8, the pattern repetition length R is three times the perimeter of the embossing device 30.

The embossed structure is in register with at least a first set of design elements being common for all patterns in the pattern repetition subsequent each other in the length direction. In one example, the embossed structure is in register with the set of first patterns P11, P21, P31, P41, subsequent each other in the width direction. The embossed structure is at least partly in register with the set of second patterns P12, P22, P32, P42 and with the set of third patterns P13, P23, P33, P43. For example, the embossed structure is in register with the first set of design elements 13 which are common to both the set of first patterns P11, P21, P31, P41, the set of second patterns P12, P22, P32, P42 and the set of third patterns P13, P23, P33, P43. Thereby, the print may be varied with an embossed structure at least being partly in register with the print, without producing unique embossing devices for each pattern.

The laminated substrate 20 may be divided into panels, as mentioned above and shown in dashed lines in FIG. 8. The length of the panel may substantially correspond to the length of the pattern. All panels may have an equal length.

The length of the panel may substantially correspond to the perimeter C2, C3 of the embossing device 30. If the embossing roller 31 is used, the circumference C2 of the embossing roller 31 substantially correspond to the length of the panel. If the embossing press belt 33 is used, the perimeter C3 of the embossing press belt 33 substantially correspond to the length of the panel.

In the example shown in FIG. 8, the laminated substrate 20 is intended to be divided into 36 panels. 12 of the 36 panels have unique patterns, wherein the patterns are at least partly in register with the embossed structure.

In all examples above, the polymer based material of the substrate, the film and/or the protective film may be different polymer based materials, or may be the same polymer based material.

The invention claimed is:

1. A method to produce a laminated substrate with an embossed structure, comprising:
    providing a polymer based film printed by at least one gravure cylinder,
    applying the polymer based film on a substrate comprising a polymer based material,
    pressing said polymer based film to the substrate, thereby forming a laminated substrate, and
    embossing the laminated substrate by an embossing device such that the laminated substrate obtains an embossed structure,
    wherein a circumference of said at least one gravure cylinder exceeds a perimeter of the embossing device,
    wherein the circumference of said at least one gravure cylinder divided by the perimeter of the embossing device substantially corresponds to an integer,
    wherein said at least one gravure cylinder comprises at least a first pattern and a second pattern, the second pattern being subsequent to the first pattern in a rotational direction of said at least one gravure cylinder, and wherein the embossed structure corresponds to at least one of the first pattern and the second pattern such that the embossed structure is in register with at least one of the first pattern and the second pattern, and
    wherein the first pattern and the second pattern each comprise a first set of design elements being identical and a second set of design elements not being identical, wherein the embossed structure is at least in register with the first set of design elements.

2. The method according to claim 1, further comprising dividing the laminated substrate into panels, wherein a length of a panel substantially corresponds to a length of one of said first or second patterns as seen in the rotational direction of the said at least one gravure cylinder.

3. The method according to claim 2, wherein the panel is a plank or a tile, and the length of one of said first or second patterns corresponds to the length of the plank or the tile.

4. The method according to claim 1, wherein the substrate is formed by a continuous process, and the polymer based film is continuously applied on the substrate.

5. The method according to claim 4, wherein the polymer based film is applied to the substrate prior to cooling the substrate.

6. The method according to claim 1, further comprising dividing the laminated substrate into panels, wherein a length of a panel substantially corresponds to the perimeter of the embossing device.

7. The method according to claim 1, wherein said first or second patterns are wood grain patterns.

8. The method according to claim 1, wherein the substrate is formed by extruding.

9. The method according to claim 1, further comprising applying a protective layer to said polymer based film prior to embossing.

10. The method according to claim 1, wherein pressing comprises applying heat and pressure.

11. The method according to claim 1, wherein the substrate further comprises fillers, the fillers being one or more of: calcium carbonate, chalk, limestone, talc, stone dust, fly ash, wood dust, grounded risk husk, cork, bamboo dust.

12. The method according to claim 1, wherein the polymer based film is a PVC film.

13. The method according to claim 1, wherein the embossed structure corresponds to at least the first set of design elements.

14. A method to produce a laminated substrate with an embossed structure, comprising:
    providing a polymer based film printed by at least one gravure cylinder,
    applying the polymer based film on a substrate comprising a polymer based material,
    pressing said polymer based film to the substrate, thereby forming a laminated substrate, and
    embossing the laminated substrate by an embossing device such that the laminated substrate obtains an embossed structure,
    wherein a circumference of said at least one gravure cylinder exceeds a perimeter of the embossing device, and
    wherein the circumference of said at least one gravure cylinder divided by the perimeter of the embossing device substantially corresponds to an integer,
    wherein said at least one gravure cylinder comprises a number of subsequent patterns as seen in a rotational direction of said at least one gravure cylinder, wherein the number of subsequent patterns corresponds to said integer,
    wherein each of said subsequent patterns comprises a first set of design elements being identical and a second set of design elements not being identical, and wherein the embossed structure is at least in register with the first set of design elements.

15. The method according to claim 14, wherein the embossed structure corresponds to at least the first set of design elements.

* * * * *